Nov. 14, 1967    M. WILSON    3,352,440
LOADING RAMP
Filed March 7, 1966
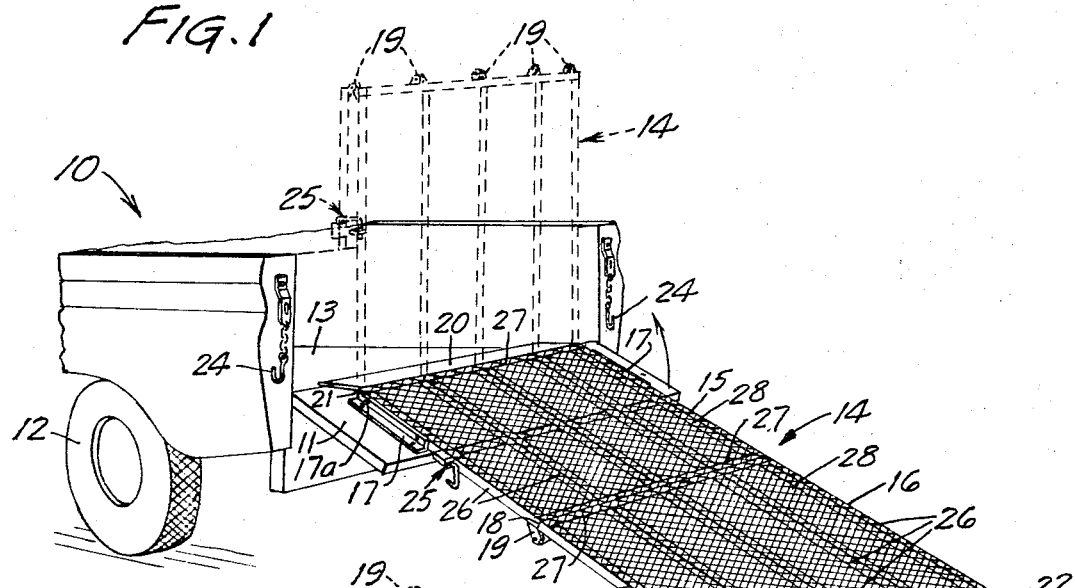
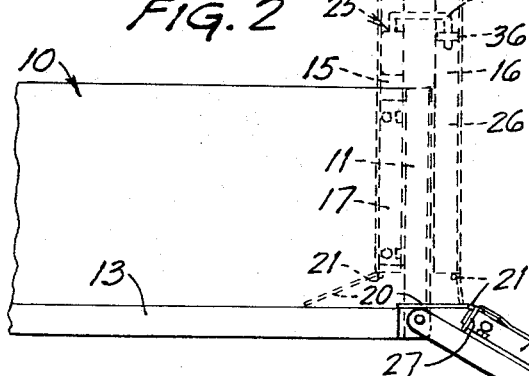
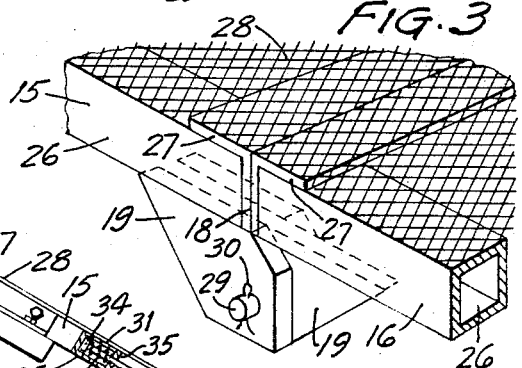
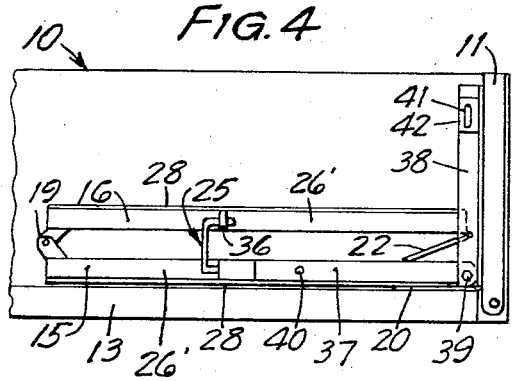
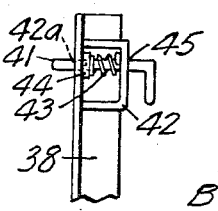
INVENTOR
MERTON WILSON
BY
Braddock + Burd
ATTORNEYS

United States Patent Office 3,352,440
Patented Nov. 14, 1967

3,352,440
LOADING RAMP
Merton Wilson, Hutchinson, Minn., assignor, by mesne assignments, to Earl Industries, Inc., Sherburn, Minn., a corporation of Minnesota
Filed Mar. 7, 1966, Ser. No. 532,316
7 Claims. (Cl. 214—85)

This invention relates to a device for loading cargo onto the bed of a truck and more particularly relates to a foldable ramp attached to the tail gate of a pickup truck.

Pickup trucks are typically used for hauling cargo ranging from refrigerators to small tractors. Cargo hauled by pickup trucks is typically hauled for a short distance with a high frequency of loading and unloading. It is therefore desirable to have a ramp which allows the items which must be loaded or unloaded to be moved with a maximum of ease. Typical portable ramps or skids presently used consist of simply a non-skid metal plate which is generally stored loose on the bed of the pickup truck. When the operator wishes to load or unload cargo he simply lowers the tail gate and pushes the ramp out of the truck to effect a bridge between the ground and the truck bed. This type ramp presents several problems. Ramps have been known to slip off of the truck bed thereby dropping and oftentimes damaging the load. It is also very difficult to store the ramp once the pickup truck has been loaded in that the room on the bed on which the ramp would be placed has been used by the load and the ramp cannot be slid under the load.

With these comments in mind it is to the elimination of these and other disadvantages to which the present invention is directed, along with the inclusion therein of other novel and desirable features.

An object of my invention is to provide a new and improved ramp of simple and inexpensive construction and operation.

Another object of my invention is the provision of a ramp which folds into position for loading and folds up into position for transport with a minimum of ease.

Another object of my invention is the provision of a ramp which may be alternated between the stored position and the loading-unloading position without disturbing cargo already loaded and without the need for manipulating complex positioning locks.

Another object of my invention is the provision of a ramp which may be used as a ramp from the ground to the truck bed or from the truck bed to a dock.

An additional object of my foldable ramp is the provision of a unit which may be quickly installed or removed from the truck and which has sufficient structural strength to accommodate any cargo which may be transported by the truck.

A further object of my invention is the provision of a ramp which, when stored for transport, does not block visibility and does not have wind resistance which affects the handling of the truck.

Another object of my invention is the provision of a skid resistance, self-cleaning ramp surface for safe cargo handling.

These and other objects and advantages of my invention will more fully appear from the following description made in connection with the accompanying drawings wherein like reference characters refer to the same or similar parts throughout the several views.

FIG. 1 is a diagrammatic view showing my foldable ramp attached to the tailgate of a pickup truck and, in dotted lines, in transport position on the pickup truck tailgate.

FIG. 2 is a side view with parts in section and parts broken away, showing the detail of construction of my foldable ramp mounted on a tailgate in position to load or unload cargo and, in dotted lines, in position for transport.

FIG. 3 is a fragmentary perspective view showing the construction of a hinge of my foldable ramp.

FIG. 4 is a side view of an alternate form of my invention showing my foldable ramp folded back onto the bed of the truck. In this view, the closest side of the truck box has been omitted for clarity of illustration.

FIG. 5 is an enlarged view of a portion of said alternate embodiment of my invention showing the means for releasably securing the ramp to the tailgate for loading or unloading cargo.

Referring to FIG. 1, the rear portion of a pickup truck is shown and is indicated, in general, by numeral 10. The pickup truck has a tailgate 11, wheels 12 and a bed 13. The loading ramp of my invention is shown mounted on the pickup tailgate 11 and is indicated, in general, by numeral 14. The ramp typically includes an upper portion 15 and a lower portion 16. The upper portion 15 is secured to the tailgate 11 by a pair of brackets 17 and bolts 17a disposed on each side of the upper ramp portion 15. The brackets are typically angle irons with about 1¼ to 1½ inch legs and are bolted along one leg to the tailgate 11 and along the other leg to the upper ramp portion 15. Brackets 17 provide additional strength to the upper ramp portion and shorten the load carrying span of the ramp. Lower ramp portion 16 is hingedly connected to upper ramp portion 15 along a transverse hinge line 18 by a series of hinges 19. An upper approach plate 20 is hingedly connected along a transverse hinge line 21 to the upper ramp portion 15. This upper approach plate 20 is typically formed from non-skid steel plate and provides a means for bridging the gap between the tailgate 11 and bed 13 of the pickup truck 10. The leading edge of the upper approach plate engages the bed and the trailing edge engages the upper ramp portion 15. A lower approach plate 22 is hingedly connected along a transverse fold line 23 to the lower ramp portion 16 and engages the ground or a dock, bridging the gap between the lower ramp portion 16 and either the ground or a dock.

FIG. 1 shows in dotted lines the loading ramp of my invention secured in transport position on pickup truck 10. The tail gate is raised to an upright position. As the tailgate 11 is raised to the upright position the upper ramp portion is also disposed in an upright position on the inside of the pickup truck, adjacent the bed 13 and generally disposed in an upright position in relation thereto. Simultaneously, lower ramp portion 16 is folded downwardly about hinges 19 along transverse parting line 18, sandwiching tailgate 11 between the upper and lower ramp portions 15 and 16, respectively. A ramp securing bracket 25 secures the upper and lower portion together maintaining the portions in an upright position securely sandwiching the tailgate therebetween. The tailgate in turn is secured in the truck in the upright position with pins 24 in a conventional manner. The loading ramp is now ready for transport and, in this position, does not interfere with the cargo carried on the bed 13 of the truck 10.

The upper and lower ramp portions 15 and 16 respectively, are constructed in the same manner. Each portion includes a series of longitudinal stringers 26 of equal lengths joined by transverse members 27 at each end of the series of stringers. The stringers 26 are typically 1¼ to 1½ inch standard square steel tubing. The transverse members are typically 1¼ to 1½ inch standard steel angles. The transverse members are welded to the longitudinal stringers with the legs of the angles 27 disposed generally downwardly covering the ends of the stringers 26, and with the other leg of the angles 27 disposed over the top of the stringers 26. This forms a rigid framework onto which is welded a surface 28 of expanded metal. The expanded metal is self-cleaning and non-skid. However, other surface materials may be used such as a non-skid plate which does not have perforations or even planks bolted to the longitudinal stringers. Both upper and lower ramp portions 15 and 16 are formed in the same manner.

Referring to FIG. 3, a detail of the arrangement of the stringers 26 with the transverse members 27 is shown. Transverse members 27 abut at the hinge assembly and this face-to-face engagement distributes the end thrust from a load to all the stringers. Also shown is the construction and attachment of one of the hinges 19 to one of the stringers 26. Each of the stringers has such a hinge attached thereto for optimum load distribution. The view shows upper ramp portion 15 and lower ramp portion 16 joined together by one of the several hinges 19. These hinges formed of steel plate as shown and typically each comprises three sections, one section of which is welded to a lower ramp portion stringer, the other sections of which sandwich the first section and are welded to an upper ramp portion stringer. A pin 29 is disposed transversely through the sections of the hinge 19 and a cotter key 30 maintains pin 29 in place. It should be noted that pin 29 is widely spaced from stringer 26. This provides for distribution of the load through the depth of the abutting face of transverse members 27 rather than concentrating the compression at the upper edge of the transverse member or end thrust from a load. Separate expanded metal coverings 28 are welded to the transverse members 27 and the stringers 26 of each ramp portion to form surfaces to handle cargo.

FIGS. 1 and 3 show the ramp in operating position with the upper and lower ramp portions in substantially the same plane. The dotted lines of FIG. 1 show the upper and lower portions folded with hinges 19 providing suitable spacing between the upper and lower ramp portions to provide room for the upright tail gate which is sandwiched therebetween. Since this pivot point is disposed away from the longitudinal stringers, the stringers do not fold into continuous relation, but fold into spaced relation, the spacing being approximately twice the distance from the center line of pin 29 to the closest edge of stringer 26. Hinge 19 must be strong enough and of a configuration such that the ramp 14 will not buckle along parting or hinge line 18 when cargo is transported over the ramp.

The ramp securing bracket 25 is shown in FIG. 2, securing upper and lower ramp portions about the tailgate 11 as shown in dotted lines. The bracket 25 consists of a socket 31 welded to an outer stringer 26. Socket 31 houses one leg of an interconnecting member 32. The leg of member 32 which is disposed in socket 31 is surrounded by a spring 33 which is secured to the leg by a collar 34. A shoulder 35 prevents spring 33 from leaving socket 31. A receiving socket 36 is welded to the other ramp portion and receives the other leg of supporting member 32. Spring 33 normally maintains the interconnecting member 32 disposed in socket 36 which holds the ramp portions together for transport. Also shown in dotted lines in FIG. 2 is the spaced relation of the upper and lower ramp portions 15 and 16, respectively, which spacing is effected by hinge 19.

Operation

In operation, my foldable ramp is attached to the tailgate 11 of pickup truck 10 utilizing angle brackets 17 which are bolted to the tailgate and to the outer longitudinal stringers 26 of the upper portion 15 of the loading ramp 14. Approach plate 20 is folded to bridge between the bed 13 of the truck and the expanded metal surface of the upper ramp portion 15. After the loading ramp is properly attached to the tailgate, the lower portion 16 is folded along hinge 19 into substantially the same plane as portion 15. Approach plate 22 is folded to engage the ground and bridge the gap between the ground and the upper surface of the lower portion 16. This disposes the ramp in position to load or unload cargo from the bed of the pickup truck.

After the loading or unloading operation has been completed, the loading ramp 14 may be placed in transport position. This is done by simultaneously lifting tailgate 11 upwardly into an upright relation to truck bed 13, and folding the lower portion 16 into an upright position and in spaced relation to the upper portion 15. The tailgate is secured to the truck in the upright position by conventional securing means 24. In this position tailgate 11 is sandwiched between upper ramp portion 15 and lower portion 16. Securing bracket 25 can then be engaged to secure the upper and lower ramp portions in this position to safely transport the ramp to another job site.

An alternate embodiment of my invention is shown in FIG. 4. This embodiment provides for placing the loading ramp on the truck bed 13. In some instances, as when carrying no load, it may be desirable to place the loading ramp in the pickup truck, rather than have it disposed upright on the tailgate. This may be done by pivotally attaching the upper portion 37 of the modified ramp to brackets 38 which provide a transverse pivot point 39. The upper portion of the ramp is provided with an aperture 40 in stringer 26' which is adapted to receive a securing member 41 which may be placed in registry with aperture 40. FIG. 5 shows a frame 42 which is welded to bracket 38 on the upright leg thereof. Pin 41 is disposed through bracket 42 and through aperture 42a in bracket 38 and is adapted to engage aperture 40 in stringer 26' of the upper ramp portion, thereby securing the upper ramp portion to the tailgate. Spring 43 is disposed on member 41 between the upright leg of the bracket 38 and the bracket 42. A collar 44 is mounted on member 41 adjacent the upright leg of the bracket 38. A spring retaining shoulder 45 is provided in the frame 42 to retain spring 43.

It will, of course, be understood that various changes may be made in the form, details, arrangement and proportions of the various parts without departing from the scope of my invention.

The embodiments of the invention in which an exclusive property or priviledge is claimed are defined as follows:

1. A foldable ramp adapted to be attached to the tail gate of a truck, said ramp comprising:
   upper and lower, generally rectangular ramp portions, each of said ramp portions including a rigid frame and a ramp load supporting surface affixed to said frame;
   means for attaching said upper ramp portion to a tailgate; and
   a hinge assembly hingedly connecting said upper and lower ramp portions to permit positioning said ramp portions in edge abutting and co-planar relation and to permit folding said ramp portions into generally opposed, spaced relation adapted to sandwich the tailgate of a truck therebetween.

2. The combination as specified in claim 1, and means releasably securing said lower ramp portion in fixed relation to the tailgate.

3. The foldable ramp of claim 1 wherein the rigid frame includes a plurality of rigid, longitudinal stringers having transverse members affixed thereto in rectangular relation, one transverse member of each frame disposed in edge abutting relation to the other at said hinge assembly to permit distribution of ramp load forces to the longitudinal stringers in the upper and lower rigid frames.

4. The foldable ramp of claim 1 including approach plates hingedly connected along the edges of said upper and lower ramp portions opposite the edges joined by said hinge assembly.

5. The foldable ramp of claim 1 wherein said hinge assembly includes a plurality of hinges attached to said upper and lower ramp portions, each of the hinges including at least one rigid member affixed to the upper ramp frame and at least one rigid member affixed to the lower ramp frame, each hinge member having an aperture therein, which apertures are located in registry and receive a pivot pin, the aperture being spaced from the upper and lower ramp loading supporting surfaces a sufficient distance to permit clearance to sandwich the tail gate between said upper and lower ramp portions and to permit distribution of load forces through the depth of said abutting ramp portions.

6. The foldable ramp of claim 2 wherein said securing means includes a spring loaded interconnecting member affixed to one of said ramp portions, a spring maintaining the interconnecting member in a normally closed position, and a socket adapted to receive the interconnecting member affixed to the other of said ramp portions whereby said upper and lower ramp portions may be secured in generally opposed, spaced relation to sandwich the tail gate of a truck therebetween.

7. The foldable ramp of claim 1 wherein said attaching means includes a pair of brackets mounted to the tail gate of a truck, a pivotal connection between the outer end of said upper ramp portion at least one of said brackets includes a normally closed, spring loaded pin adapted to engage and secure said upper ramp portion, said upper ramp portion having an aperture disposed in registry with the bracket and pin assembly, and said upper ramp portion pivotally mounted on said bracket to permit folding said upper and lower ramp portions into a truck.

References Cited
UNITED STATES PATENTS

| | | | |
|---|---|---|---|
| 2,721,758 | 10/1955 | Allen | 296—61 |
| 2,727,781 | 12/1955 | D'Eath | 296—61 |
| 2,797,960 | 7/1957 | Endres et al. | 296—61 |

GERALD M. FORLENZA, *Primary Examiner.*

A. J. MAKAY, *Assistant Examiner.*